US012779925B2

(12) United States Patent
Choi et al.

(10) Patent No.: US 12,779,925 B2
(45) Date of Patent: Nov. 3, 2026

(54) ROBOT AND METHOD OF DERIVING A CENTER OF GRAVITY OF A SYSTEM

(71) Applicants: HYUNDAI MOTOR COMPANY, Seoul (KR); KIA CORPORATION, Seoul (KR)

(72) Inventors: Jae Hyuk Choi, Hwaseong-si (KR); Jun Hwan Park, Hwaseong-si (KR); Hun Keon Ko, Hwaseong-si (KR); Ho Seong Kang, Hwaseong-si (KR); Ji Woo Ha, Hwaseong-si (KR); Ye Sol Kim, Hwaseong-si (KR); Joo Young Chun, Hwaseong-si (KR); Geun Sang Yu, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 106 days.

(21) Appl. No.: 18/883,751

(22) Filed: Sep. 12, 2024

(65) Prior Publication Data

US 2025/0360770 A1 Nov. 27, 2025

(30) Foreign Application Priority Data

May 22, 2024 (KR) ........................ 10-2024-0066622

(51) Int. Cl.
*B60G 17/017* (2006.01)
*B25J 5/00* (2006.01)
(Continued)

(52) U.S. Cl.
CPC ............ *B60G 17/017* (2013.01); *B25J 5/007* (2013.01); *G01G 19/08* (2013.01); *G01G 21/22* (2013.01);
(Continued)

(58) Field of Classification Search
CPC .............. B60G 17/017; B60G 2200/13; B60G 2202/42; B60G 2204/81; B60G 2400/60;
(Continued)

(56) References Cited

FOREIGN PATENT DOCUMENTS

| | | |
|---|---|---|
| KR | 102005405 B1 | 7/2019 |
| KR | 20190096007 A | 8/2019 |

(Continued)

*Primary Examiner* — Lindsay M Low
*Assistant Examiner* — Omar Morales
(74) *Attorney, Agent, or Firm* — Lempia Summerfield Katz LLC

(57) ABSTRACT

A robot includes a platform onto which an item is loaded, an actuator module connected to the platform and configured to move the platform, and a controller. The controller is configured to derive one or more of information indicative of a weight of the loaded item or information indicative of a center of gravity of a system including the platform and the loaded item in a state in which the item is loaded onto the platform. The controller is configured to derive one or more of information indicative of the weight of the loaded item, information indicative of a horizontal position of the center of gravity of the system including the platform and the loaded item, or information indicative of a height of the center of gravity of the system based on a load applied to a partial region of the actuator module.

15 Claims, 6 Drawing Sheets

(51) Int. Cl.
*G01G 19/08* (2006.01)
*G01G 21/22* (2006.01)
*G01M 1/12* (2006.01)

(52) U.S. Cl.
CPC ......... *G01M 1/122* (2013.01); *B60G 2200/13* (2013.01); *B60G 2202/42* (2013.01); *B60G 2204/81* (2013.01); *B60G 2400/60* (2013.01); *B60G 2400/63* (2013.01); *B60G 2500/30* (2013.01); *B60G 2600/182* (2013.01); *B60G 2800/01* (2013.01); *B60G 2800/914* (2013.01)

(58) Field of Classification Search
CPC ............ B60G 2400/63; B60G 2500/30; B60G 2600/182; B60G 2800/01; B60G 2800/914; B25J 5/007; B25J 5/00; B25J 9/16; B25J 9/1664; B25J 9/1679; B25J 19/02; G01G 19/08; G01G 21/22; G01M 1/122
USPC ............................................................ 701/37
See application file for complete search history.

(56) References Cited

FOREIGN PATENT DOCUMENTS

KR 102405594 B1 6/2022
WO WO-2016181627 A1 * 11/2016 ............... B65G 1/10

* cited by examiner

ROBOT AND METHOD OF DERIVING A CENTER OF GRAVITY OF A SYSTEM

CROSS-REFERENCE TO RELATED APPLICATION

This application claims priority to and the benefit of Korean Patent Application No. 10-2024-0066622 filed in the Korean Intellectual Property Office on May 22, 2024, the entire contents of which are incorporated herein by reference.

TECHNICAL FIELD

The present disclosure relates to a robot and a method of deriving a center of gravity of a system.

BACKGROUND

Mobile robots may move items to targeted positions. For example, items which may be required to be delivered may be loaded onto a mobile robot. The mobile robot may deliver the loaded items to the targeted positions.

Current mobile robots in the related art may be manufactured to be equipped with a weight detection sensor to identify the weight of a loaded item. However, this approach causes technical problems since the position of the center of gravity and the height of the system cannot be identified only by the weight detection sensor. Thus, there is a problem in that it is difficult to maximize performance of the mobile robot by only using information on the weight of the system.

SUMMARY

The present disclosure provides a robot capable of deriving information indicative of a center of gravity of a system including a loaded item and a platform. The derived information is used to cause the robot to switch postures and configuration to maximize the performance of the robot. As such, the disclosed embodiments provide a technical solution to these technical problems.

In particular, information including data, which is related to or indicative of the center of gravity of the system, may be used to ensure the traveling stability of the mobile robot. The information related to the center of gravity of the system may include, but is not limited to, information regarding, or indicative of, a platform provided on the mobile robot, loaded items loaded onto the platform, and the weight of the loaded items.

In order to achieve the above-mentioned objects, one aspect of the present disclosure provides a robot including a platform onto which an item is loaded, an actuator module connected to the platform and configured to move the platform, and a controller. The controller is configured to derive one or more of information indicative of a weight of the loaded item, information indicative of a center of gravity of a system including the platform and the loaded item in a state in which the item is loaded onto the platform, or any combination thereof. The controller is configured to derive one or more of information indicative of the weight of the loaded item, information indicative of a horizontal position of the center of gravity of the system including the platform and the loaded item, information indicative of a height of the center of gravity of the system, or any combination thereof based on a load applied to a partial region of the actuator module.

In addition, when the weight of the loaded item is smaller than a threshold allowable weight, the controller may be configured to control the actuator module to move the platform in the state in which the item is loaded onto the platform and may be configured to derive a vertical height of the center of gravity of the system based on the movement of the platform.

In addition, the controller may be configured to derive a horizontal position of the center of gravity of the system based on a load applied to the actuator module. When the horizontal position of the center of gravity of the system is a first position based on a state in which the platform is placed in a first posture oriented in the horizontal direction and when the horizontal position of the center of gravity of the system is a second position based on a state in which the platform is placed in a second posture rotated by a first angle from the first posture so that the platform is oriented to be inclined by the first angle with respect to the horizontal direction, the controller may be configured to derive a first height by comparing the first position and the second position. The first height may be the vertical height of the center of gravity of the system.

In addition, the platform may be configured to switch from the first posture to the second posture when rotating in a first rotation direction by the first angle about a rotation center that passes through a first position point. The first position point may correspond to the first position on the platform and may extend in a width direction of the platform. When the horizontal position of the center of gravity of the system is a third position based on a state in which the platform is placed in a third posture rotated by the first angle in a second rotation direction about the rotation center from the state in which the platform is placed in the first posture, the controller may be configured to derive a second height by comparing the first position and the third position. The second rotation direction may be a direction opposite to the first rotation direction and the second height may include the vertical height of the system. The controller may compare the first height and the second height and determine that the loaded item is fixed to the platform when a difference value between the first height and the second height is equal to or smaller than a threshold value.

In addition, the actuator module may include a motor mounted on the platform, an eccentric arm configured to be changed in posture by the motor and having one end mounted on the motor, and a wheel rotatably connected to the other end of the eccentric arm. The robot may be configured to be placed in a ground surface parallel posture in which the platform is placed in the first posture, the eccentric arm is oriented in the horizontal direction, and the other end of the eccentric arm is spaced apart from the platform in a longitudinal direction of the platform. Alternatively, or in addition, the robot may be configured to be placed in a ground surface angle posture in which the platform is placed in the second posture, the eccentric arm is oriented in a direction intersecting the horizontal direction, the eccentric arm is oriented to be inclined with respect to the horizontal direction, and the other end of the eccentric arm is spaced apart from the platform in the longitudinal direction of the platform. The first position may be the horizontal position of the center of gravity of the system based on the state in which the robot is placed in the ground surface parallel posture. The second position may be the horizontal position of the center of gravity of the system based on the state in which the robot is placed in the ground surface angle posture.

In addition, the actuator module may include a plurality of actuator modules. The plurality of actuator modules may include a first actuator module disposed at one longitudinal side of the platform and a second actuator module disposed at the other longitudinal side of the platform. The first actuator module may include a first-first actuator module disposed at one widthwise side of the platform and may include a first-second actuator module disposed at the other widthwise side of the platform. The second actuator module may include a second-first actuator module disposed at one widthwise side of the platform and may include a second-second actuator module disposed at the other widthwise side of the platform. Heights of eccentric arms of the first-first actuator module and the first-second actuator module may be equal to each other. Heights of eccentric arms of the second-first actuator module and the second-second actuator module may be equal to each other based on the state in which the robot is placed in the ground surface parallel posture or the ground surface angle posture. When the heights of the eccentric arms of the first-first actuator module and the first-second actuator module are first drive heights and the heights of the eccentric arms of the second-first actuator module and the second-second actuator module are second drive heights, the first drive height and the second drive height may be equal to each other when the robot is placed in the ground surface parallel posture. The first drive height and the second drive height may be different from each other when the robot is placed in the ground surface angle posture.

In addition, the controller may be configured to derive a weight of the loaded item based on a weight of the platform, a torque applied to the motors of the plurality of actuator modules, and a length of the eccentric arm based on the state in which the robot is placed in the ground surface parallel posture.

In addition, the weight of the loaded item may be derived based on Equation 1 below.

$$Fa=Ma*g=((T11+T12+T21+T22)/(e*g)-Mp)*g \quad \text{[Equation 1]}$$

In Equation 1 above, Fa is a weight of the loaded item, Ma is a mass of the loaded item, Mp is a mass of the platform, T11 is a torque applied to the motor of the first-first actuator module, T12 is a torque applied to the motor of the first-second actuator module, T21 is a torque applied to the motor of the second-first actuator module, T22 is a torque applied to the motor of the second-second actuator module, e is a length of the eccentric arm, and g is a gravitational acceleration.

In addition, the controller may be configured to derive a first length position based on a length of the platform and torque applied to the motors of the plurality of actuator modules based on the state in which the robot is placed in the ground surface parallel posture. The first length position may be a longitudinal position on the platform at the center of gravity of the system and a position spaced apart from one longitudinal end of the platform in the longitudinal direction by a first length distance and spaced apart from the other longitudinal end of the platform in the longitudinal direction by a second length distance.

In addition, the first length distance and the second length distance may be derived based on Equations 2-1 and 2-2 below, respectively.

$$DL1=(L-DL1)*(T21+T22)/(T11+T12) \quad \text{[Equation 2-1]}$$

In Equation 2-1 above, DL1 is the first length distance, L is a distance between two opposite longitudinal ends of the platform, T11 is a torque applied to the motor of the first-first actuator module, T12 is a torque applied to the motor of the first-second actuator module, T21 is a torque applied to the motor of the second-first actuator module, and T22 is a torque applied to the motor of the second-second actuator module.

$$DL2=L-DL1 \quad \text{[Equation 2-2]}$$

In Equation 2-2 above, DL2 is the second length distance.

In addition, the controller may be configured to derive a first width position based on a width of the platform and a torque applied to the motors of the plurality of actuator modules based on the state in which the robot is placed in the ground surface parallel posture. The first width position may be a widthwise position on the platform at the center of gravity of the system and may be a position spaced apart from one widthwise end of the platform in the width direction by a first width distance and spaced apart from the other widthwise end of the platform in the width direction by a second width distance.

In addition, the first width distance and the second width distance may be derived based on Equations 3-1 and 3-2 below, respectively.

$$DW1=(W-DW1)*(T12+T22)/(T11+T21) \quad \text{[Equation 3-1]}$$

In Equation 3-1, DW1 is the first width distance, W is a distance between two opposite widthwise ends of the platform, T11 is a torque applied to the motor of the first-first actuator module, T12 is a torque applied to the motor of the first-second actuator module, T21 is a torque applied to the motor of the second-first actuator module, and T22 is a torque applied to the motor of the second-second actuator module.

$$DW2=W-DW1 \quad \text{[Equation 3-2]}$$

In Equation 3-2, DW2 is the second width distance.

In addition, the controller may be configured to derive a second length position based on a length of the platform and a torque applied to the motors of the plurality of actuator modules based on the state in which the robot is placed in the ground surface angle posture. The second length position may be a longitudinal position on the platform at the center of gravity of the system and may be a position spaced apart from one longitudinal end of the platform in the longitudinal direction by a third length distance and spaced apart from the other longitudinal end of the platform in the longitudinal direction by a fourth length distance. When an upper end of the other longitudinal side of the platform is positioned above one longitudinal end of the platform, the first height may be derived on the basis of Equation 4 below.

$$h=(DL3-DL1)/\sin(a) \quad \text{[Equation 4]}$$

In Equation 4, h is the first height, DL3 is the third length distance, and a is the first angle.

In addition, another aspect of the present disclosure provides a method of deriving a center of gravity of a system. The method includes a loading step of loading an item onto a platform. The method further includes a gravity center information deriving step of deriving one or more of information indicative of a weight of the loaded item, information on a center of gravity of a system including the loaded item and the platform in a state in which the item is loaded onto the platform, or any combination thereof. The gravity center information deriving step includes deriving one or more of information indicative of the weight of the loaded item, information indicative of a horizontal position of the center of gravity of the system including the platform and the loaded item, information indicative of a height of the center of gravity of the system, or any combination thereof based on a load applied to a partial region of a actuator module configured to move the platform.

In addition, the gravity center information deriving step may include a comparison step of comparing the weight of the loaded item and a threshold allowable weight. The gravity center information deriving step may further include a height deriving step of deriving the height of the center of gravity of the system based on a movement of the platform when the weight of the loaded item is smaller than the threshold allowable weight.

In addition, the gravity center information deriving step may further include a horizontal position deriving step of deriving a horizontal position of the center of gravity of the system. The horizontal position deriving step may include deriving a first position based on a state in which the platform is placed in a first posture oriented in the horizontal direction. The first position may be the horizontal position of the center of gravity of the system. When the horizontal position of the center of gravity of the system is a second position based on a state in which the platform is placed in a second posture rotated by a first angle from the first posture so that the platform is oriented to be inclined by the first angle with respect to the horizontal direction, the gravity center information deriving step may include a first height deriving step of deriving a first height by comparing the first position and the second position. The first height may be a vertical height of the center of gravity of the system.

In addition, the platform may be configured to switch from the first posture to the second posture when rotating in a first rotation direction by the first angle about a rotation center that passes through a first position point. The first position point may correspond to the first position on the platform and may extend in a width direction of the platform. When the horizontal position of the center of gravity of the system is a third position based on a state in which the platform is placed in a third posture rotated by the first angle in a second rotation direction about the first position from the state in which the platform is placed in the first posture, the gravity center information deriving step may further include a second height deriving step of deriving a second height by comparing the first position and the third position. The second rotation direction may be a direction opposite to the first rotation direction. The second height may be the vertical height of the center of gravity of the system with respect to the platform. The gravity center information deriving step may further include a determination step of comparing the first height and the second height and determining that the loaded item is fixed to the platform when a difference value between the first height and the second height is equal to or smaller than a threshold value.

The robot according to the present disclosure may derive information indicative of the center of gravity of the system including the loaded item and the platform and may maximize the operational efficiency by using the derived information indicative of the center of gravity.

DETAILED DESCRIPTION

Figure 1:
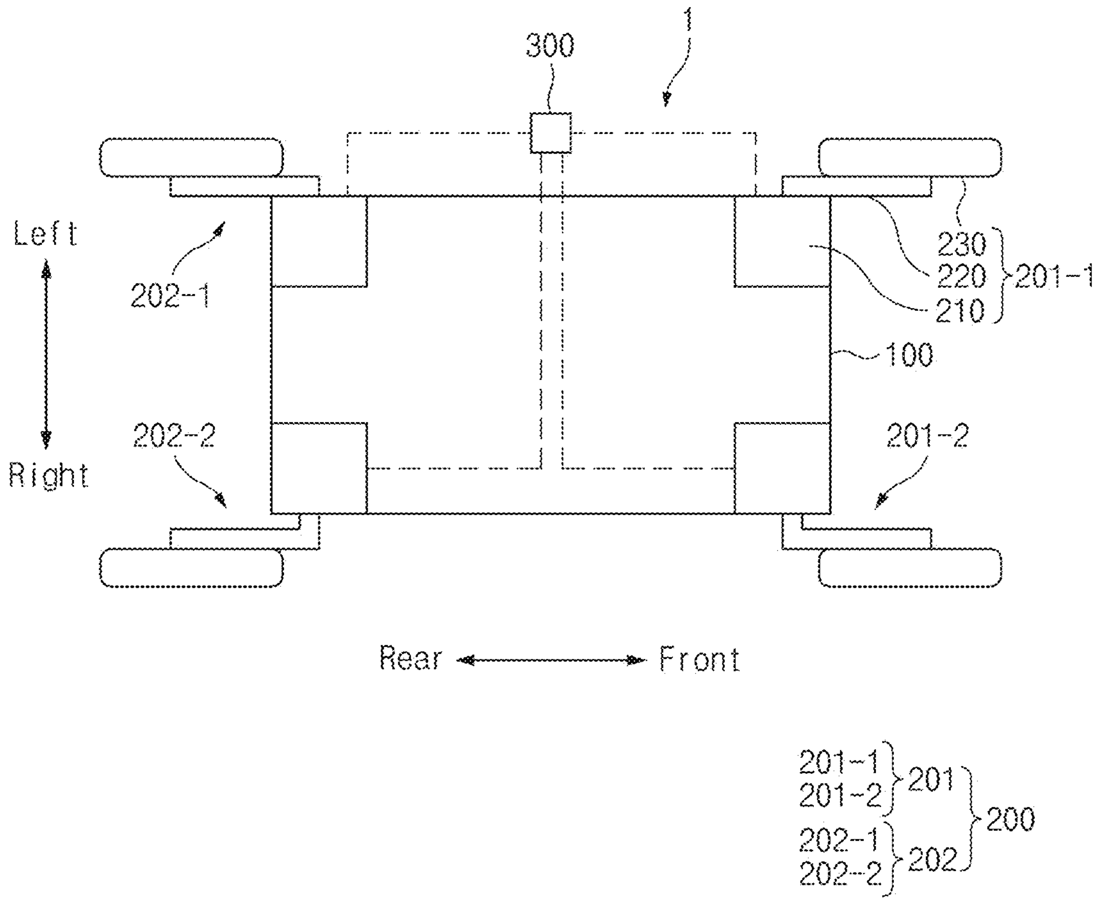
FIG. 1 is a top plan view of a robot according to an embodiment of the present disclosure.

Various embodiments of the present disclosure are described below in detail with reference to the illustrative drawings. In giving reference numerals to constituent elements of the respective drawings, it should be noted that the same constituent elements are designated by the same reference numerals, if possible, even though the constituent elements are illustrated in different drawings. Further, in the following description of the embodiments of the present disclosure, a detailed description of related publicly-known configurations or functions has been omitted where it has been determined that the detailed description would have obscured the understanding of the embodiments of the present disclosure.

In addition, terms such as "~part," "module," and the like in the specification refer to a unit that handles at least one function or operation, which may be implemented in hardware or software or a combination of hardware and software. When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer readable media, as part of an apparatus, e.g., a robot, or system. The processor may be a suitably programmed, e.g. via executable instructions stored in the memory, or a specifically configured processor such as an FPGA or ASIC.

The robot and the method may automatically collect data regarding a state of the robot or system for different purposes. The state of the robot may include whether an item is loaded on a platform of the robot, whether the robot is placed or disposed on a posture on a surface, e.g., whether a controller or processor causes the robot to assume a posture or position, whether the robot switches from one posture to another posture, e.g., whether the controller or the processor causes the robot to switch from one position or posture to another position or posture, and the like. The current, prior or future state, or change/transition therebetween, may be used to determine or derive various information as described below. It should be appreciated that these states may be referred to by other terminology and the robot or method may implement fewer or more states or sub-states depending upon the implementation.

Robot 1

As shown in FIG. 1, a robot 1 according to the present disclosure is described below with reference to the drawings.

Figure 2:
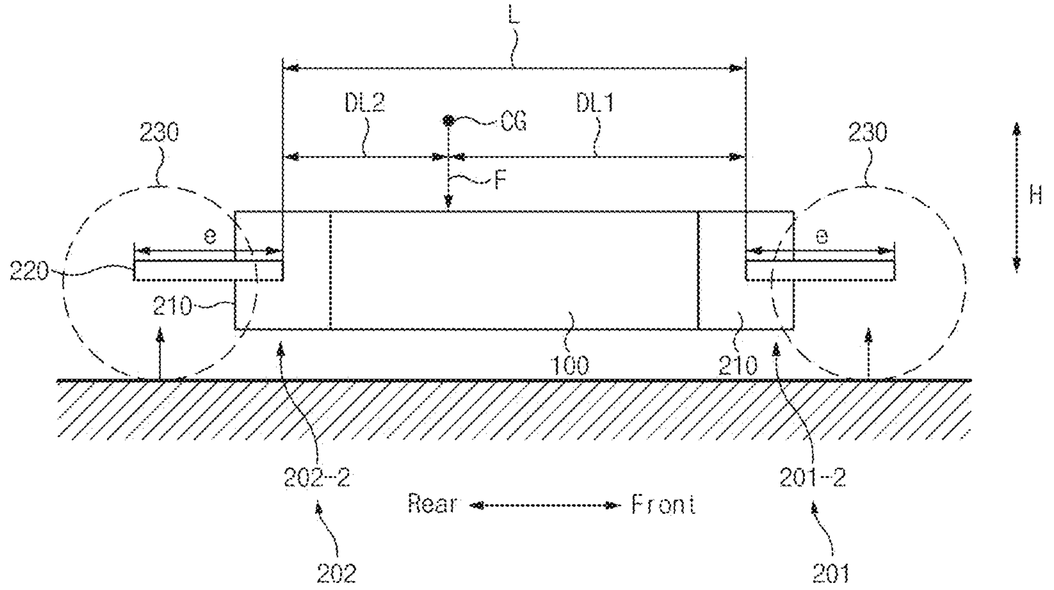
FIG. 2 is a view illustrating a longitudinal position of a center of gravity of a system including a platform and a loaded item according to an embodiment of the present disclosure.
Figure 3:
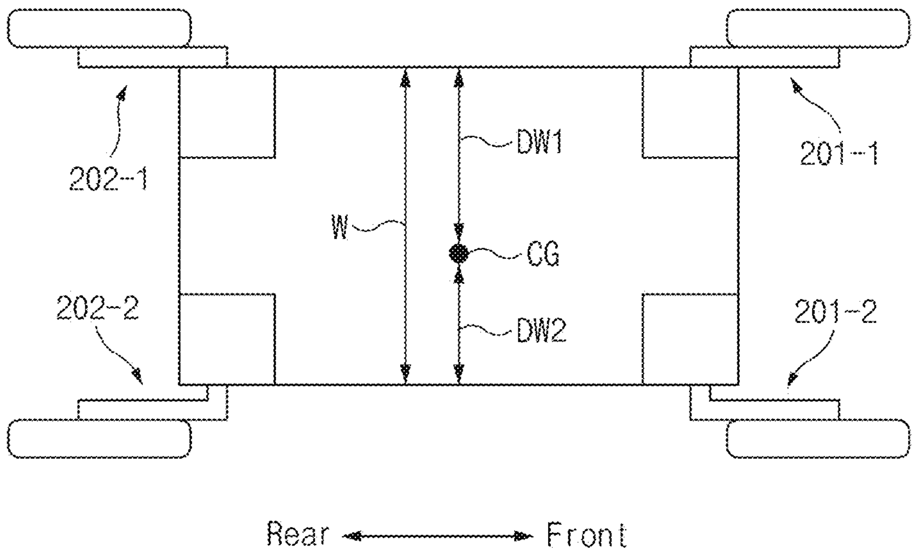
FIG. 3 is a view illustrating a widthwise position of a center of gravity of the system including the platform and the loaded item according to an embodiment of the present disclosure.

FIG. 1 is a top plan view of the robot 1 according to an embodiment of the present disclosure. FIG. 2 is a view illustrating a longitudinal position of a center of gravity of a system including a platform and a loaded item according to an embodiment of the present disclosure. FIG. 3 is a view illustrating a widthwise position of a center of gravity of the system including the platform and the loaded item according to the embodiment of the present disclosure.

With reference to FIGS. 1-3, the robot 1 may travel along the ground surface. The robot 1 may deliver a loaded item, which may be required to be delivered, to a targeted position. The loaded item may refer to an item loaded onto a platform 100 that is further described below. The robot 1 may be referred to as a 'delivery robot' or 'mobile robot'. The robot 1 may include the platform 100, an actuator module 200, and a controller 300. The controller 300 may include a processor as described above. The actuator module 200 may be implemented by the controller 300 or a separate processor described above.

The loaded item may be seated on the platform 100. The platform 100 may be supported by the actuator module 200. In addition, the platform 100 may be disposed to be spaced apart upward from the ground surface. With reference to FIG. 2, the platform 100 may be placed in a first posture oriented in a horizontal direction.

Figure 4:
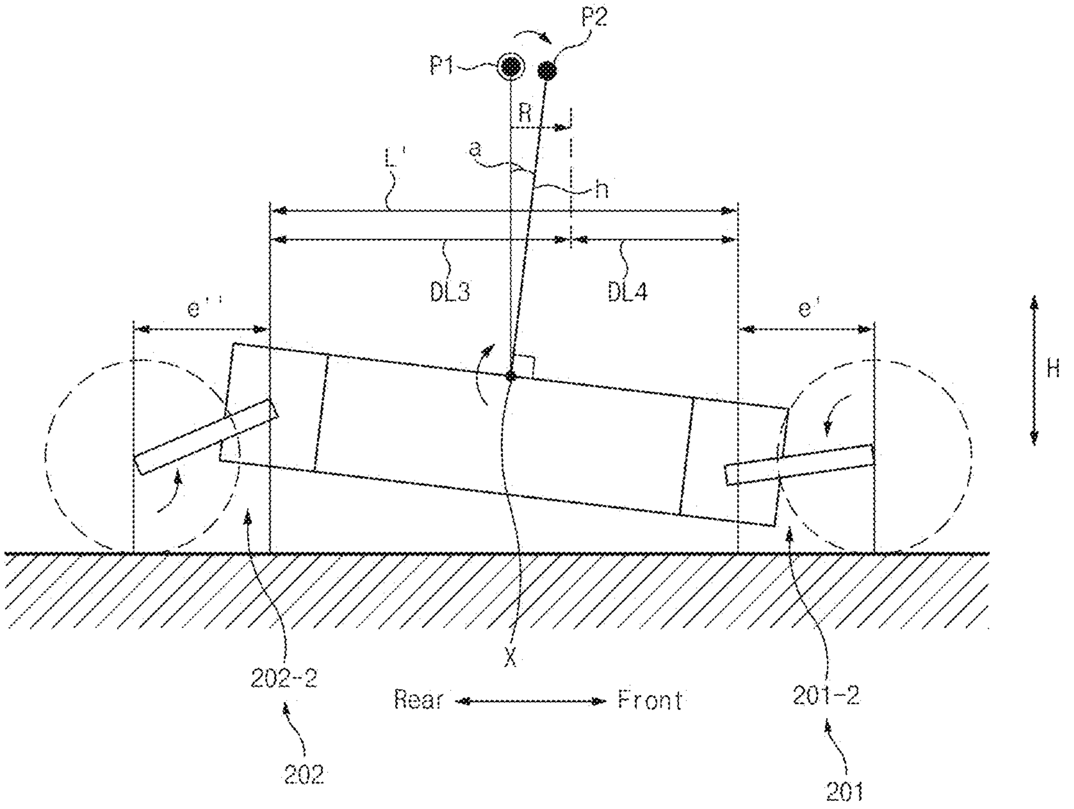
FIG. 4 is a view illustrating a state in which the platform switches from a first posture to a second posture according to an embodiment of the present disclosure.
Figure 5:
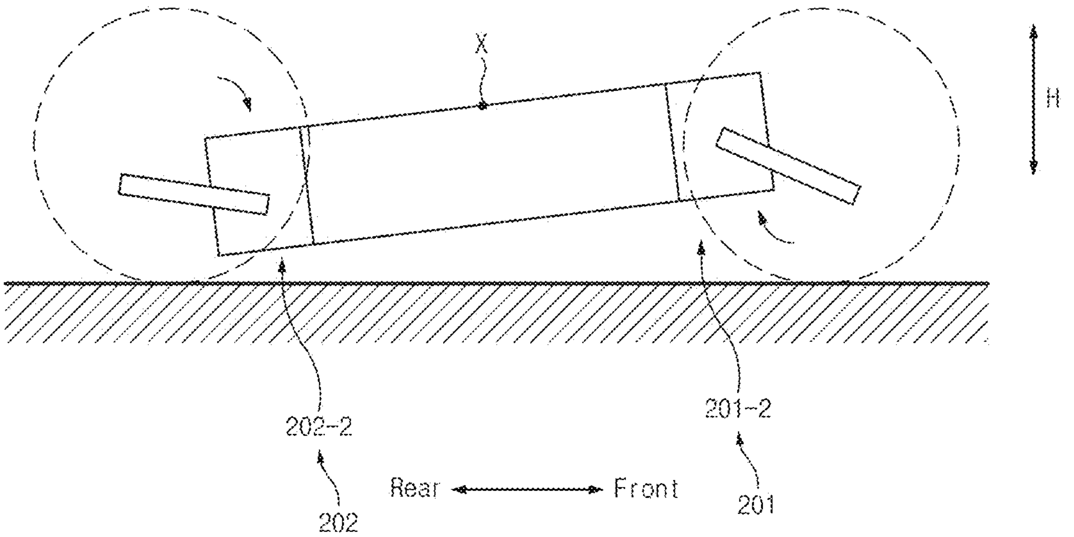
FIG. 5 is a view illustrating a state in which the platform switches from the first posture to a third posture according to an embodiment of the present disclosure.

FIG. 4 is a view illustrating a state in which the platform 100, according to an embodiment of the present disclosure, switches from the first posture to a second posture. FIG. 5 is a view illustrating a state in which the platform, according to an embodiment of the present disclosure, switches from the first posture to a third posture.

With reference to FIGS. 4 and 5, the platform 100 may switch from the first posture and may be placed in the second or third posture oriented to be inclined with respect to the horizontal direction.

With reference to FIG. 4, the platform 100 placed in the first posture may switch from the first posture to the second posture when rotating in a first rotation direction by a first angle a about a rotation center that passes through a corresponding point X. The corresponding point X refers to a first position point corresponding to a first position on the platform 100 and extends in a leftward or rightward direction. The first position may refer to a horizontal position of a center of gravity CG (shown in FIGS. 2 and 3) of a system including the platform 100 and the loaded item based on the state in which the platform 100 is placed in the first posture. In addition, the corresponding point X may refer to a first position point intersecting a straight line that passes through the first position on an upper surface of the platform 100 and extends in an upward or downward direction H.

In addition, the first rotation direction may refer to a clockwise direction when the right side of the robot 1 is viewed in parallel with the leftward or rightward direction. For example, when the platform 100 is placed in the second posture, the platform 100 may be oriented to be inclined so that a center of a front end is positioned below a center of a rear end of the platform 100.

With reference to FIG. 5, the platform 100 placed in the first posture may switch from the first posture to the third posture by rotating in a second rotation direction about the first position X, i.e., the rotation center, to create the first angle. The second rotation direction may be defined as, i.e., refer to or include, a direction opposite to the first rotation direction. For example, when the platform 100 is placed in the third posture, the platform 100 may be oriented to be inclined so that the center of the front end is positioned above the center of the rear end of the platform 100.

The actuator module 200 may move the platform 100 relative to the ground surface. The actuator module 200 may be controlled by the controller 300. The actuator module 200 may be provided as a plurality of actuator modules 200. The plurality of actuator modules 200 may include a first actuator module 201 and a second actuator module 202.

The first actuator module 201 may be disposed at one longitudinal side of the platform 100. In the present specification, the longitudinal direction may be defined as, i.e., refer to or include, the forward or rearward direction. For example, the first actuator module 201 may be disposed at a front side of the platform 100. The first actuator module 201 may be provided as a plurality of first actuator modules 201. The plurality of first actuator modules 201 may include a first-first actuator module 201-1 and a first-second actuator module 201-2.

The first-first actuator module 201-1 and the first-second actuator module 201-2 may be spaced apart from each other in a width direction. In the present specification, the width direction may be defined as, i.e., refer to or include, the leftward or rightward direction. The first-first actuator module 201-1 may be disposed at one widthwise side of the platform 100. For example, the first-first actuator module 201-1 may be disposed at a front left side of the platform 100. In addition, the first-second actuator module 201-2 may be disposed at the other widthwise side of the platform 100. For example, the first-second actuator module 201-2 may be disposed at a front right side of the platform 100.

The second actuator module 202 may be disposed at the other longitudinal side of the platform 100. For example, the second actuator module 202 may be disposed at a rear side of the platform 100. The second actuator module 202 may be provided as a plurality of second actuator modules 202. The plurality of second actuator modules 202 may include a second-first actuator module 202-1 and a second-second actuator module 202-2.

The second-first actuator module 202-1 and the second-second actuator module 202-2 may be spaced apart from each other in the width direction. The second-first actuator module 202-1 may be disposed at one widthwise side of the platform 100. For example, the second-first actuator module 202-1 may be disposed at a rear left side of the platform 100. The second-second actuator module 202-2 may be disposed at the other widthwise side of the platform 100. For example, the second-second actuator module 202-2 may be disposed at a rear right side of the platform 100.

The first-first actuator module 201-1, the first-second actuator module 201-2, the second-first actuator module 202-1, and the second-second actuator module 202-2 may each include a motor 210, an eccentric arm 220, and a wheel 230.

The motor 210 may include a stator, a rotor, and a shaft and operate by being supplied with energy from the outside, e.g., an external source. The motor 210 may provide the eccentric arm 220 and the wheel 230 with power for rotating the eccentric arm 220 and the wheel 230.

The eccentric arm 220 may allow or enable a center of the motor 210 and a center of the wheel 230 to be spaced apart from each other. For example, one end of the eccentric arm 220 may be connected to the shaft of the motor 210, and the other end of the eccentric arm 220 may be rotatably connected to the center of the wheel 230. One end of the eccentric arm 220 may be configured to rotate about a rotation axis extending in the widthwise direction, and the other end of the eccentric arm 220 may be configured to revolve around a rotation axis extending in the widthwise direction.

In addition, based on a state in which the robot 1 is placed in a ground surface parallel posture or a ground surface angle posture to be described below, heights of the eccentric arms 220 of the first-first actuator module 201-1 and the first-second actuator module 201-2 may be equal to each other. Further, heights of the eccentric arms 220 of the second-first actuator module 202-1 and the second-second actuator module 202-2 may be equal to each other.

In addition, the heights of the eccentric arms 220 of the first-first actuator module 201-1 and the first-second actuator module 201-2 may be referred to as first drive heights. The heights of the eccentric arms 220 of the second-first actuator module 202-1 and the second-second actuator module 202-2 may be referred to as second drive heights.

When the robot 1 is placed in the ground surface parallel posture, the first drive height and the second drive height may be equal to each other. In addition, when the robot 1 is placed in the ground surface angle posture, the first drive height and the second drive height may be different from each other.

The wheel 230 may be configured to rotate relative to the other end of the eccentric arm 220. In addition, the center of the wheel 230 may be configured to revolve relative to one end of the eccentric arm 220. The wheel 230 may include a rim, a tire, or the like.

The system or robot 1 may include one or more measurement subsystems (not shown) coupled to the controller 300. Each of the one or more measurement subsystems may include one or more sensors, transceivers, or the like to sense or otherwise measure one or more physical or environmental, e.g. analog, parameters or receive/detect external signals, e.g. positional signals such as GPS transmission, which may change depending upon the operation of the system or robot 1 and generate or otherwise derive “measured” data indicative thereof as described.

In the state in which the loaded item is seated on the platform 100, the controller 300 may derive information indicative of the weight of the loaded item and information indicative of the center of gravity CG of the system including the loaded item and the platform 100. Based on a partial region of the actuator module 200 (e.g., a load applied to the shaft of the motor 210), the controller 300 may derive one or more of information indicative of the weight of the loaded item, information indicative of the center of gravity CG of the system including the platform 100 and the loaded item, or any combination thereof.

For example, based on a load electric current value, i.e., a value of electric current flowing through the motor 210 provided in each of the plurality of actuator modules 200, the controller 300 may derive information indicative of the weight of the loaded item and information indicative of the center of gravity CG of the system including the platform 100 and the loaded item.

In a more detailed example, assuming that torque, which is applied to the shaft of the motor 210 by the wheel 230, the platform 100, and the loaded item, is an external force torque, the load electric current value may mean, i.e., refer to a value of electric current applied to the motor 210 to generate torque (torque equal in magnitude to the external force torque and opposite in direction to the external force torque) for canceling out the external force torque to prevent the shaft of the motor 210 from being rotated by the external force torque.

Based on the state in which the robot 1 is placed in the ground surface parallel posture, the controller 300 may derive the weight of the loaded item based on the weight of the platform 100, the electric current applied to the plurality of motors 210, and the length of the eccentric arm 220. When the robot 1 is placed in the ground surface parallel posture, the platform 100 may be placed in the first posture, and a longitudinal spacing distance between the wheel 230 of the first actuator module 201 (e.g., the other end of the eccentric arm 220) and the wheel 230 of the second actuator module 202 (e.g., the other end of the eccentric arm 220) may be maximized.

For example, the controller 300 may derive torque applied to the plurality of motors 210 based on the electric current applied to the plurality of motors 210.

In another example, the robot 10 may further include a torque sensor configured to measure torque applied to the plurality of motors 210. For example, the torque sensor may be provided as, i.e., may include, a plurality of torque sensors. The plurality of torque sensors may measure a torque applied to the plurality of motors 210. The torque applied to the plurality of motors 210 may include a plurality of torques including torques T11, T12, T21, and T22 as described below. A plurality of torque values measured by the plurality of torque sensors may be transmitted to the controller 300. The plurality of torque sensors may be electrically connected to the controller 300.

The controller 300 may derive a weight F of the system based on the torque applied to the plurality of motors 210 and the length of the eccentric arm 220. In addition, the controller 300 may derive a mass Ma of the loaded item from the weight F of the system and a mass Mp of the platform input in advance.

For example, the controller 300 may derive the weight of the loaded item based on the Equation 1 below.

$$Fa=Ma*g=((T11+T12+T21+T22)/(e*g)-Mp)*g \quad \text{[Equation 1]}$$

In Equation 1 above, Fa is a weight of the loaded item, Ma is the mass of the loaded item, Mp is the mass of the platform, T11 is a torque applied to the motor of the first-first actuator module, T12 is a torque applied to the motor of the first-second actuator module, T21 is a torque applied to the motor of the second-first actuator module, T22 is a torque applied to the motor of the second-second actuator module, e is the length of the eccentric arm, and g is the gravitational acceleration.

The controller 300 may compare the weight of the loaded item with a threshold allowable weight. The threshold allowable weight may refer to a maximum weight of the loaded item allowed to be seated on the robot 1. For example, when the weight of the loaded item is smaller than the threshold allowable weight, the controller 300 may control the actuator module 200 so that the platform 100 moves in the state in which the item is loaded onto the platform 100. In addition, when the weight of the loaded item is equal to or larger than the threshold allowable weight, the controller 300 may transmit an announcement to an external device. The announcement may indicate that the weight of the loaded item is larger than the threshold allowable weight.

In addition, based on the state in which the robot 1 is placed in the ground surface parallel posture, the controller 300 may derive a first length position that is a longitudinal position on the platform 100 at the center of gravity CG of the system based on the length of the platform 100 and the electric current applied to the plurality of motors 210.

The first length position may be defined as a position spaced apart from one longitudinal end (e.g., the front end) of the platform 100 in the longitudinal direction by a first length distance DL1. In addition, the first length position may be defined as a position spaced apart from the other longitudinal end (e.g., the rear end) of the platform 100 in the longitudinal direction by a second length distance DL2.

The first length distance DL1 and the second length distance DL2 may be derived based on Equations 2-1 and 2-2 below, respectively.

$$DL1=(L-DL1)*(T21+T22)/(T11+T12) \quad \text{[Equation 2-1]}$$

In Equation 2-1 above, DL1 is the first length distance, L is a distance between two opposite longitudinal ends of the platform, T11 is the torque applied to the motor of the first-first actuator module, T12 is the torque applied to the motor of the first-second actuator module, T21 is the torque applied to the motor of the second-first actuator module, and T22 is the torque applied to the motor of the second-second actuator module.

$$DL2=L-DL1 \quad \text{[Equation 2-2]}$$

In Equation 2-2 above, DL2 is the second length distance.

In addition, based on the state in which the robot 1 is placed in the ground surface parallel posture, the controller 300 may derive a first width position, i.e., a widthwise position on the platform 100 at the center of gravity CG of the system based on the width of the platform 100 and the electric current applied to the plurality of motors 210.

The first width position may be defined as a position spaced apart from one widthwise end (e.g., the left end) of the platform 100 in the width direction by a first width distance DW1. In addition, the first width position may be defined as a position spaced apart from the other widthwise end (e.g., the right end) of the platform 100 in the width direction by a second width distance DW2.

The first width distance DW1 and the second width distance DW2 may be derived based on Equations 3-1 and 3-2 below, respectively.

$$DW1=(W-DW1)*(T12+T22)/(T11+T21) \quad \text{[Equation 3-1]}$$

In Equation 3-1 above, DW1 is the first width distance, W is the distance between two opposite widthwise ends of the platform, T11 is the torque applied to the motor of the first-first actuator module, T12 is the torque applied to the motor of the first-second actuator module, T21 is the torque applied to the motor of the second-first actuator module, and T22 is the torque applied to the motor of the second-second actuator module.

$$DW2=W-DW1 \quad \text{[Equation 3-2]}$$

In Equation 3-2 above, DW2 is the second width distance.

In addition, based on the state in which the robot 1 is placed in the ground surface angle posture, the controller 300 may derive a second length position, i.e., a longitudinal position on the platform 100 at the center of gravity CG of the system based on the length of the platform 100 and the torques applied to the plurality of motors 210.

When the robot 1 is placed in the ground surface angle posture, the platform 100 may be placed in the second posture, and the other end of each of the plurality of eccentric arms 220 (e.g., the center of each of the plurality of wheels 230) may be placed in a state of being spaced apart from the platform 100 in the longitudinal direction.

The second length position may be defined as a position spaced apart from one longitudinal end (e.g., the front end) of the platform 100 in the longitudinal direction by a third length distance DL3. In addition, the second length position may be defined as a position spaced apart from the other longitudinal end (e.g., the rear end) of the platform 100 in the longitudinal direction by a fourth length distance DL4.

The third length distance DL3 and the fourth length distance DL4 may be derived by a method corresponding to Equations 2-1 and 2-2 above. For example, the third length distance DL3 and the fourth length distance DL4 may be derived based on the torque applied to the plurality of motors 210 and a distance L' between the two opposite longitudinal ends of the platform 100 when the robot 1 is placed in the ground surface angle posture.

The controller 300 may derive a first height H, which is a vertical height of the center of gravity CG of the system, by comparing the first position and a second position. In other words, the first height H may refer to or include the vertical height of the center of gravity CG of the system. The second position may be defined as the horizontal position of the center of gravity CG of the system based on the state in which the platform 100 is placed in the second posture.

In case that one longitudinal side (e.g., an upper end of the front side) of the platform 100 is positioned above the other longitudinal end of the platform, the controller 300 may derive the first height H, which is the height of the center of gravity CG of the system when the robot 1 is placed in the ground surface parallel posture, based on Equation 4 below. In other words, the first height H may refer to or include the height of the center of gravity CG of the system when the robot 1 is placed in the ground surface parallel posture.

$$h=R/\sin(a), R=DL3-DL1 \quad \text{[Equation 4]}$$

In Equation 4 above, h is the first height, DL3 is a third length distance, R is the amount of change in longitudinal position of the center of gravity of the system, and a is the first angle.

The amount R of change in longitudinal position of the center of gravity of the system may mean, i.e., refer to, a longitudinal spacing distance between an initial position P1 of the center of gravity CG of the system and a changed position P2 of the center of gravity CG of the system.

The first angle a may be defined as, i.e., may refer to or may include, an angle between a first reference straight line, which passes through the corresponding point X and the initial position P1, and a second reference straight line, which passes through the corresponding point X and the changed position P2, when the right side of the robot 1 is viewed in parallel with the leftward or rightward direction.

In addition, the controller 300 may derive a second height, which is a vertical height of the system, by comparing the first position and a third position. In other words, the second height may refer to or include the vertical height of the system. The third position may be defined as, i.e., may refer to or may include a horizontal position of the center of gravity CG of the system based on the state in which the platform 100 is placed in the third posture.

The controller 300 may derive the second height, which is the vertical height of the system, by comparing the first position and the third position. In other words, the second height may refer to or include the vertical height of the system. In addition, the controller 300 may compare the first height H and the second height and determine that the loaded item is fixed to the platform 100 in case that a difference value between the first height H and the second height is equal to or smaller than a threshold value or 0. For example, the controller 300 may determine that the loaded item is fixed to the platform 100 when the first height H and the second height are equal to each other. In addition, when a difference value between the first height H and the second height is larger than the threshold value, the controller 300 may transmit an announcement, which indicates that the loaded item is not properly fixed. The announcement may be transmitted to the outside, an external device. In response, the controller 300 may cause the robot 1 to take an action, e.g., move the platform 100, switch postures, and the like, to fix the problem and to ensure the traveling stability of the robot 1.

In other words, the controller 300 may derive the first height H when the platform 100 switches from the first posture to the second posture. The controller 300 may derive the second height when the platform 100 switches from the first posture to the third posture. When an error between the first height H and the second height is within a threshold value, the controller 300 may determine that the loaded item is securely fixed to the platform 100.

The controller 300 may be electrically connected to the actuator module 200 and implemented as a process that serves to decode and execute instructions based on the input information.

Method S10 of Deriving Center of Gravity of System

Method S10 of deriving the center of gravity of the system according to an embodiment of the present disclosure is described below with reference to FIG. 6.

Figure 6:
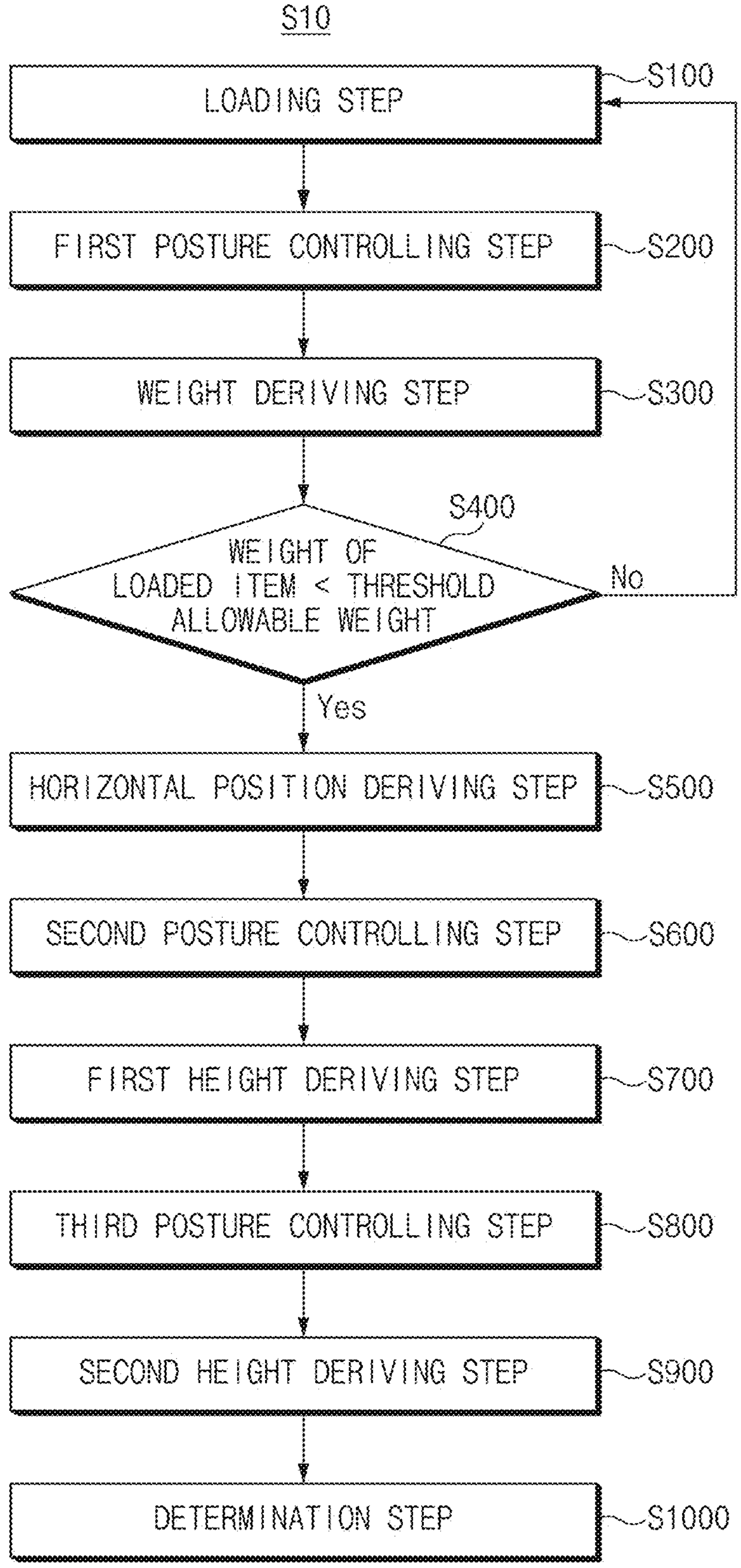
FIG. 6 is a flowchart illustrating a method of deriving a center of gravity of the system according to an embodiment of the present disclosure.

FIG. 6 is a flowchart illustrating a method of deriving a center of gravity of the system according to an embodiment of the present disclosure.

The method S10 of deriving the center of gravity of the system may include a loading step S100 and gravity center information deriving steps S200, S300, S400, S500, S600, S700, S800, and S900.

In the loading step S100, the item may be loaded onto the platform 100.

In the gravity center information deriving steps S200, S300, S400, S500, S600, S700, S800, and S900, one or more of information indicative of the weight of the loaded item, information indicative of the center of gravity of the system, or any combination thereof may be derived in the state in which the item is loaded onto the platform 100.

For example, in the gravity center information deriving steps S200, S300, S400, S500, S600, S700, S800, and S900, one or more of information indicative of the weight of the loaded item, information indicative of the horizontal position of the center of gravity of the system, information indicative of the height of the center of gravity of the system, or any combination thereof may be derived based on a load applied to a partial region of the actuator module 200.

The gravity center information deriving steps may include a first posture controlling step S200, a weight deriving step S300, a comparison step S400, a horizontal position deriving step S500, a second posture controlling step S600, a first height deriving step S700, a third posture controlling step S800, a second height deriving step S900, and a determination step S1000.

In the first posture controlling step S200, the platform 100 may be placed in the first posture so that the robot 1 is placed in the ground surface parallel posture. For example, the first posture controlling step S200 may be performed after the loading step S100.

In the weight deriving step S300, the weight of the loaded item may be derived. The weight of the loaded item may be derived on the basis of Equation 1 above. For example, the weight deriving step S300 may be performed after the first posture controlling step S200.

In the comparison step S400, the weight of the loaded item and the threshold allowable weight may be compared with each other. When the comparison result in the comparison step S400 indicates that the weight of the loaded item is smaller than the threshold allowable weight, the horizontal position deriving step S500 may be performed. In addition, when the comparison result in the comparison step S400 indicates that the weight of the loaded item is equal to or larger than the threshold allowable weight, the loading step S100 may be performed again. For example, the comparison step S400 may be performed after the weight deriving step S300.

In the horizontal position deriving step S500, the horizontal position of the center of gravity CG of the system may be derived. For example, in the horizontal position deriving step S500, the first position may be derived.

In the second posture controlling step S600, an operation in which the platform 100 switches from the first posture to the second posture may be performed. In the second posture controlling step S600, the second position, which is the horizontal position of the center of gravity CG of the system, may be derived based on the state in which the platform 100 is placed in the second posture. For example, the second posture controlling step S600 may be performed after the horizontal position deriving step S500.

In the first height deriving step S700, the first height H, which is the vertical height of the center of gravity CG of the system, may be derived by comparing the first position and the second position. The first height H may be derived based on Equation 4 above. For example, the first height deriving step S700 may be performed after the second posture controlling step S600.

In the third posture controlling step S800, an operation in which the platform 100 switches from the first posture to the third posture may be performed. In the third posture controlling step S800, the third position, which is the horizontal position of the center of gravity CG of the system, may be derived based on the state in which the platform 100 is placed in the third posture. For example, the third posture controlling step S800 may be performed after the first height deriving step S700.

In the second height deriving step S900, the second height, which is the vertical height of the center of gravity CG of the system, may be derived by comparing the first position and the third position. For example, the second height deriving step S900 may be performed after the third posture controlling step S800.

In the determination step S1000, whether the loaded item is fixed to the platform 100 may be determined by comparing the first height H and the second height. For example, in the determination step S1000, whether a difference value between the first height H and the second height is equal to or smaller than the threshold value or larger than the threshold value may be determined. In the determination step S1000, it may be determined that the loaded item is fixed to the platform 100 when the difference value between the first height H and the second height is equal to or smaller than the threshold value (e.g., 0). In addition, in the determination step S1000, it may be determined that the loaded item is not fixed to the platform 100 when the difference value between the first height H and the second height is larger than the threshold value.

All the constituent elements, which constitute the embodiment of the present disclosure, may be integrally coupled or operate by being combined, but the present disclosure is not necessarily limited to the embodiment. That is, one or more of the constituent elements may be selectively combined and operated within the object of the present disclosure. In addition, unless explicitly described to the contrary, the words "comprise," "include," or "have" and variations such as "comprises," "comprising," "includes," "including," has," or "having," should be understood to imply the inclusion of stated elements but not the exclusion of any other elements. Unless otherwise defined, all terms including technical or scientific terms may have the same meaning as commonly understood by those skilled in the art to which the present disclosure pertains. The terms such as those defined in a commonly used dictionary may be interpreted as having meanings consistent with meanings in the context of related technologies and may not be interpreted as ideal or excessively formal meanings unless explicitly defined in the present disclosure.

The above description is simply given for illustratively describing the technical spirit of the present disclosure. Those having ordinary skill in the art to which the present disclosure pertains should appreciate that various changes and modifications are possible without departing from the essential characteristic of the present disclosure. Therefore, the embodiments disclosed in the present disclosure are provided for illustrative purposes only but not intended to limit the technical spirit of the present disclosure. The scope of the technical spirit of the present disclosure is not limited thereby. The protective scope of the present disclosure should be construed based on the following claims. All the technical spirit in the equivalent scope thereto should be construed as falling within the scope of the present disclosure.

What is claimed is:

1. A robot comprising:

a platform onto which an item is loaded;

an actuator module connected to the platform and configured to move the platform; and a controller configured to derive one or more of information indicative of a weight of the loaded item, information indicative of a center of gravity of a system including the platform and the loaded item in a state in which the item is loaded onto the platform, or any combination thereof, derive one or more of information indicative of the weight of the loaded item, information indicative of a horizontal position of the center of gravity of the system including the platform and the loaded item, information indicative of a height of the center of gravity of the system, or any combination thereof based on a load applied to a partial region of the actuator module, derive a horizontal position of the center of gravity of the system based on the load applied to the actuator module, and based on the horizontal position of the center of gravity of the system being a first position based on a state in which the platform is placed in a first posture oriented in a horizontal direction and based on the horizontal position of the center of gravity of the system being a second position based on a state in which the platform is placed in a second posture rotated by a first angle from the first posture so that the platform is oriented to be inclined by the first angle with respect to the horizontal direction, derive a first height by comparing the first position and the second position, wherein the first height is a vertical height of the center of gravity of the system.

2. The robot of claim 1, wherein:

when the weight of the loaded item is smaller than a threshold allowable weight, the controller controls the actuator module to move the platform in the state in which the item is loaded onto the platform; and the controller is configured to derive the vertical height of the center of gravity of the system based on a movement of the platform.

3. The robot of claim 2, wherein:

the platform is configured to switch from the first posture to the second posture when rotating in a first rotation direction by the first angle about a rotation center that passes through a first position point, the first position corresponding to the first position on the platform and extending in a width direction of the platform;

when the horizontal position of the center of gravity of the system is a third position based on a state in which the platform is placed in a third posture rotated by the first angle in a second rotation direction about the rotation center from the state in which the platform is placed in the first posture, the controller is configured to derive a second height by comparing the first position and the third position, wherein the second rotation is a direction opposite to the first rotation direction and the second height is the vertical height of the system; and the controller compares the first height and the second height and determines that the loaded item is fixed to the platform when a difference value between the first height and the second height is equal to or smaller than a threshold value.

4. The robot of claim 2, wherein the actuator module comprises:

a motor mounted on the platform;

an eccentric arm configured to be changed in posture by the motor and having one end mounted on the motor; and a wheel rotatably connected to the other end of the eccentric arm, wherein the robot is configured to be placed in a ground surface parallel posture in which the platform is placed in the first posture, the eccentric arm is oriented in the horizontal direction, and the other end of the eccentric arm is spaced apart from the platform in a longitudinal direction of the platform; and a ground surface angle posture in which the platform is placed in the second posture, the eccentric arm is oriented in a direction intersecting the horizontal direction, the eccentric arm is oriented to be inclined with respect to the horizontal direction, and the other end of the eccentric arm is spaced apart from the platform in the longitudinal direction of the platform, wherein the first position is the horizontal position of the center of gravity of the system based on the state in which the robot is placed in the ground surface parallel posture, and wherein the second position is the horizontal position of the center of gravity of the system based on the state in which the robot is placed in the ground surface angle posture.

5. The robot of claim 4, wherein:

the actuator module includes a plurality of actuator modules;

the plurality of actuator modules includes a first actuator module disposed at one longitudinal side of the platform, and a second actuator module disposed at the other longitudinal side of the platform;

the first actuator module includes a first-first actuator module disposed at one widthwise side of the platform, and a first-second actuator module disposed at the other widthwise side of the platform;

the second actuator module includes a second-first actuator module disposed at one widthwise side of the platform, and a second-second actuator module disposed at the other widthwise side of the platform;

heights of the eccentric arms of the first-first actuator module and the first-second actuator module are equal to each other, and heights of the eccentric arms of the second-first actuator module and the second-second actuator module are equal to each other based on the state in which the robot is placed in the ground surface parallel posture or the ground surface angle posture; and when the heights of the eccentric arms of the first-first actuator module and the first-second actuator module are first drive heights and the heights of the eccentric arms of the second-first actuator module and the second-second actuator module are second drive heights, the first drive height and the second drive height are equal to each other when the robot is placed in the ground surface parallel posture, and the first drive height and the second drive height are different from each other when the robot is placed in the ground surface angle posture.

6. The robot of claim 5, wherein the controller is configured to derive a weight of the loaded item on the basis of a weight of the platform, a torque applied to the motors of the plurality of actuator modules, and a length of the eccentric arm based on the state in which the robot is placed in the ground surface parallel posture.

7. The robot of claim 6, wherein:

the weight of the loaded item is derived based on Equation 1 below, $$Fa=Ma*g=((T11+T12+T21+T22)/(e*g)-Mp)*g; \text{ and} \quad \text{[Equation 1]}$$

Fa is a weight of the loaded item, Ma is a mass of the loaded item, Mp is a mass of the platform, T11 is a torque applied to the motor of the first-first actuator module, T12 is a torque applied to the motor of the first-second actuator module, T21 is a torque applied to the motor of the second-first actuator module, T22 is a torque applied to the motor of the second-second actuator module, e is a length of the eccentric arm, and g is a gravitational acceleration.

8. The robot of claim 5, wherein:

the controller is configured to derive a first length position based on a length of the platform and a torque applied to the motors of the plurality of actuator modules based on the state in which the robot is placed in the ground surface parallel posture; and the first length position is a longitudinal position on the platform at the center of gravity of the system and is a position spaced apart from one longitudinal end of the platform in the longitudinal direction by a first length distance and spaced apart from the other longitudinal end of the platform in the longitudinal direction by a second length distance.

9. The robot of claim 8, wherein:

the first length distance and the second length distance are derived based on Equations 2-1 and 2-2 below, respectively, $$DL1=(L-DL1)*(T21+T22)/(T11+T12); \quad \text{[Equation 2-1]}$$

DL1 is the first length distance, L is a distance between two opposite longitudinal ends of the platform, T11 is a torque applied to the motor of the first-first actuator module, T12 is a torque applied to the motor of the first-second actuator module, T21 is a torque applied to the motor of the second-first actuator module, and T22 is a torque applied to the motor of the second-second actuator module;

$$DL2=L-DL1; \text{ and} \quad \text{[Equation 2-2]}$$

DL2 is the second length distance.

10. The robot of claim 8, wherein:

the controller is configured to derive a second length position based on a length of the platform and a torque applied to the motors of the plurality of actuator modules based on the state in which the robot is placed in the ground surface angle posture;

the second length position is a longitudinal position on the platform at the center of gravity of the system and a position spaced apart from one longitudinal end of the platform in the longitudinal direction by a third length distance and spaced apart from the other longitudinal end of the platform in the longitudinal direction by a fourth length distance;

when an upper end of the other longitudinal side of the platform is positioned above one longitudinal end of the platform, the first height is derived based on Equation 4 below, $$h=(DL3-DL1)/\sin(a); \text{ and} \quad \text{[Equation 4]}$$

h is the first height, DL3 is the third length distance, and a is the first angle.

11. The robot of claim 5, wherein:

the controller is configured to derive a first width position based on a width of the platform and a torque applied to the motors of the plurality of actuator modules based on the state in which the robot is placed in the ground surface parallel posture; and the first width position is a widthwise position on the platform at the center of gravity of the system and a position spaced apart from one widthwise end of the platform in the width direction by a first width distance and spaced apart from the other widthwise end of the platform in the width direction by a second width distance.

12. The robot of claim 11, wherein:

the first width distance and the second width distance are derived on the basis of Equations 3-1 and 3-2 below, respectively, $$DW1=(W-DW1)*(T12+T22)/(T11+T21); \quad \text{[Equation 3-1]}$$

DW1 is the first width distance, W is a distance between two opposite widthwise ends of the platform, T11 is a torque applied to the motor of the first-first actuator module, T12 is a torque applied to the motor of the first-second actuator module, T21 is a torque applied to the motor of the second-first actuator module, and T22 is a torque applied to the motor of the second-second actuator module;

$$DW2=W-DW1; \text{ and} \quad \text{[Equation 3-2]}$$

DW2 is the second width distance.

13. A method of deriving a center of gravity of a system, the method comprising:

a loading step of loading an item onto a platform; and a gravity center information deriving step of deriving one or more of information indicative of a weight of the loaded item, information indicative of a center of gravity of a system including the loaded item and the platform in a state in which the item is loaded onto the platform, or any combination thereof, wherein the gravity center information deriving step includes deriving one or more of information indicative of the weight of the loaded item, information indicative of a horizontal position of the center of gravity of the system including the platform and the loaded item, information indicative of a height of the center of gravity of the system, or any combination thereof based on a load applied to a partial region of an actuator module configured to move the platform, wherein the gravity center information deriving step further comprises a horizontal position deriving step of deriving a horizontal position of the center of gravity of the system, wherein the horizontal position deriving step includes deriving a first position based on a state in which the platform is placed in a first posture oriented in a horizontal direction, wherein the first position is the horizontal position of the center of gravity of the system, and wherein based on the horizontal position of the center of gravity of the system being a second position based on a state in which the platform is placed in a second posture rotated by a first angle from the first posture so that the platform is oriented to be inclined by the first angle with respect to the horizontal direction, the gravity center information deriving step includes a first height deriving step of deriving a first height by comparing the first position and the second position, wherein the first height is a vertical height of the center of gravity of the system.

14. The method of claim 13, wherein the gravity center information deriving step comprises:

a comparison step of comparing the weight of the loaded item and a threshold allowable weight; and a height deriving step of deriving the height of the center of gravity of the system based on a movement of the platform when the weight of the loaded item is smaller than the threshold allowable weight.

15. The method of claim 14, wherein:

the platform is configured to switch from the first posture to the second posture when rotating in a first rotation direction by the first angle about a rotation center that passes through a first position point, the first position point corresponding to the first position on the platform, and extending in a width direction of the platform;

when the horizontal position of the center of gravity of the system is a third position based on a state in which the platform is placed in a third posture rotated by the first angle in a second rotation direction, the second rotation direction is a direction opposite to the first rotation direction, about the first position from the state in which the platform is placed in the first posture; and the gravity center information deriving step further comprises a second height deriving step of deriving a second height by comparing the first position and the third position, wherein the second height is the vertical height of the center of gravity of the system with respect to the platform, and a determination step of comparing the first height and the second height and determining that the loaded item is fixed to the platform when a difference value between the first height and the second height is equal to or smaller than a threshold value.

* * * * *